United States Patent
Saito et al.

(10) Patent No.: US 8,956,777 B2
(45) Date of Patent: Feb. 17, 2015

(54) SOLID OXIDE FUEL CELL POWER PLANT HAVING A FIXED CONTACT OXIDATION CATALYZED SECTION OF A MULTI-SECTION CATHODE AIR HEAT EXCHANGER

(71) Applicant: Ballard Power Systems Inc., Burnaby, CA (US)

(72) Inventors: Kazuo Saito, Glastonbury, CT (US); Yao Lin, Hartford, CT (US)

(73) Assignee: Ballard Power Systems Inc., Burnaby (CA)

( * ) Notice: Subject to any disclaimer, the term of this patent is extended or adjusted under 35 U.S.C. 154(b) by 214 days.

(21) Appl. No.: 13/735,237

(22) Filed: Jan. 7, 2013

(65) Prior Publication Data
US 2014/0193733 A1 Jul. 10, 2014

(51) Int. Cl.
*H01M 8/04* (2006.01)

(52) U.S. Cl.
CPC ...... *H01M 8/04014* (2013.01); *H01M 8/04716* (2013.01); *H01M 8/04074* (2013.01); *H01M 8/04067* (2013.01)
USPC ........... 429/434; 429/419; 429/433; 429/440; 429/465; 429/479

(58) Field of Classification Search
CPC .......... H01M 8/04014; H01M 8/4067; H01M 8/4074; H01M 8/04716
USPC .................. 429/419, 433, 434, 440, 465, 479
See application file for complete search history.

(56) References Cited

U.S. PATENT DOCUMENTS

| | | | |
|---|---|---|---|
| 5,103,871 A * | 4/1992 | Misawa et al. | 138/148 |
| 6,920,920 B2 | 7/2005 | Whittenberger | |
| 7,150,099 B2 | 12/2006 | Whittenberger et al. | |
| 7,591,301 B2 | 9/2009 | Whittenberger | |
| 7,736,774 B2 | 6/2010 | Ogiwara et al. | |
| 7,858,256 B2 | 12/2010 | Bandhauer et al. | |
| 2011/0053027 A1 | 3/2011 | Weingaertner et al. | |

* cited by examiner

*Primary Examiner* — Patrick Ryan
*Assistant Examiner* — Ben Lewis
(74) *Attorney, Agent, or Firm* — Seed IP Law Group PLLC

(57) ABSTRACT

The multi-section cathode air heat exchanger (102) includes at least a first heat exchanger section (104), and a fixed contact oxidation catalyzed section (126) secured adjacent each other in a stack association. Cool cathode inlet air flows through cool air channels (110) of the at least first (104) and oxidation catalyzed sections (126). Hot anode exhaust flows through hot air channels (124) of the oxidation catalyzed section (126) and is combusted therein. The combusted anode exhaust then flows through hot air channels (112) of the first section (104) of the cathode air heat exchanger (102). The cool and hot air channels (110, 112) are secured in direct heat exchange relationship with each other so that temperatures of the heat exchanger (102) do not exceed 800° C. to minimize requirements for using expensive, high-temperature alloys.

17 Claims, 4 Drawing Sheets

SOLID OXIDE FUEL CELL POWER PLANT HAVING A FIXED CONTACT OXIDATION CATALYZED SECTION OF A MULTI-SECTION CATHODE AIR HEAT EXCHANGER

STATEMENT REGARDING FEDERALLY SPONSORED RESEARCH OR DEVELOPMENT

This disclosure was made with Government support under contract number DE-NT 0003894 awarded by the Department of Energy. The Government has certain rights in this disclosure.

TECHNICAL FIELD

The present disclosure relates to solid oxide fuel cells and in particular relates to a solid oxide fuel cell power plant having a partially oxidation catalyzed multi-section cathode air heat-exchanger.

BACKGROUND ART

Fuel cells are well known and are commonly used to produce electrical current from reducing fluid fuel and oxygen containing oxidant reactant streams, to power various types of electrical apparatus. Known solid oxide fuel cells ("SOFC") generate both electricity and heat by electrochemically combining a fluid reducing fuel and an oxidant across an ion conducting electrolyte. In a typical SOFC, the electrolyte is an ion conductive ceramic membrane sandwiched between an oxygen electrode (cathode) and a fuel electrode (anode). Molecular oxygen, such as from the atmosphere, reacts with electrons at the cathode electrode to form oxygen ions, which are conducted through the ceramic membrane electrolyte to the anode electrode. The oxygen ions combine with a reducing fuel such as a mixture of hydrogen and carbon monoxide to form water and carbon dioxide while producing heat and releasing electrons to flow from the anode electrode through an electrical circuit to return to the cathode electrode.

Solid oxide fuel cells have many benefits and some limitations. For example, normal operating temperatures are very high, often in excess of 700° C., which favors stationary power plants operating in a near steady-state mode to minimize deleterious effects of thermal cycling as the fuel cell is started up and shut down. Efforts have been undertaken to increase the efficiency of such solid oxide fuel cells. For example, it is known to direct flow of unused fuel as an anode exhaust stream through an anode recycle loop, wherein unused fuel is directed from an anode exhaust line of the fuel cell, typically then through one or more heat exchangers, and back into an anode inlet upstream of the fuel cell. Additionally, all of the anode exhaust stream, or a portion of the anode exhaust stream returning from the anode recycle loop, or a mixture thereof is burned in a burner generating additional heat so that flammable exhaust does not pass out of the power plant.

While much of this heat may be productively utilized, unfortunately the extremely high temperatures reached by power plant components gives rise to many problems. First, when temperatures reach or exceed 900 degrees Celsius (° C.), exotic and very expensive materials, such as nickel-based super alloys must be utilized to address high oxidation rates, cracks during thermal cycling, high-temperature creep etc. It is beneficial to prohibit temperatures within the power plant from exceeding 800° C. This permits long-term usage of iron-based stainless steel, which is much less costly than nickel-based super alloys. If temperatures exceed 800° C., iron-based stainless steel alloys will suffer a chromium evaporation from a chromium oxide layer on the surface of the stainless steel, resulting in degradation of the SOFC stack. It is known that oxidation of the anode exhaust stream within the burner will raise a temperature of the burner above 900° C. This exceeds a maximum temperature of known inexpensive catalysts and catalyst support substrates commonly used in the automotive industry, therefore requiring very expensive materials within the burner and within heat exchangers that extract heat from exhaust gases leaving the burner, such as a cathode air heat-exchanger.

Many efforts have been undertaken to burn unused fuel in the anode exhaust streams of fuel cell power plants, while minimizing negative consequences of extremely high temperatures. U.S. Patent Application Publication US 2011/0053027 of Weingaertner et al. that was published on Mar. 3, 2011 shows at FIG. 2C use of a "ATO" apparatus to burn anode tail gas then direct the burned hot exhaust stream out of the apparatus through conduits to deliver heat to other power plant components. Additionally, U.S. Pat. No. 7,736,774 to Ogiwara et al. that issued on Jun. 15, 2010 shows at FIGS. 11-18 various embodiments of a heat exchanger 26 that includes a catalyzed burner 25 within the heat exchanger. The burner directs the hot exhaust stream out of the burner and back into an adjacent cathode air or anode fuel heat exchanger. Another effort to utilize extremely hot temperatures of a combusted anode exhaust stream that is shown in U.S. Pat. No. 6,920,920 that issued on Jul. 26, 2005 to Whittenberger. This patent shows a heat-exchanger having oxidation catalysts located at various positions along one side of a metal foil to ignite combustible gases in a heat exchanger utilized in operating a catalytic fuel reformer.

While such efforts show varying usage of extremely hot, combusted anode gas streams, all of these and other known efforts result in a requirements for usage of very costly, high-temperature tolerant materials, especially when used in association with SOFC power plants that are most efficient at very high operating temperatures.

SUMMARY OF THE DISCLOSURE

The disclosure includes a solid oxide fuel cell power plant for generating an electrical current. The power plant includes a solid oxide fuel cell having a cathode flow field configured for receiving a flow of a oxidant reactant through a cathode inlet line and an anode flow field configured for receiving a flow of a reducing fuel through an anode inlet line from a fuel supply, and configured for directing the flow of the reducing fuel out of the fuel cell as an anode exhaust through an anode exhaust line. A multi-section cathode air heat exchanger is secured in fluid communication with the cathode inlet line and also with the anode exhaust line.

The multi-section cathode air heat exchanger includes at least a first heat-exchange section having opposed top and bottom walls with a plurality of cold air channels defined between the walls. The cold air channels are secured in fluid communication with the cathode inlet line for directing the oxidant reactant from the cathode inlet line through the plurality of cold air channels. The first heat-exchange section also includes a plurality of hot air channels that are defined between the top and bottom walls and that are also secured in direct heat-exchange relationship with and in fluid isolation from the first heat-exchange section cold air channels. (For purposes herein, the phrase "direct heat-exchange relationship" is to mean that each cold air channel is secured adjacent to and in physical contact with a hot air channel.)

The multi-section heat exchanger may also include a second heat-exchange section also having opposed top and bottom walls. A plurality of cold air channels are defined between the walls and the cold air channels are secured in fluid communication with the cold air channels of the first heat-exchange section. The second heat-exchange section also includes a plurality of hot air channels that are secured in direct heat-exchange relationship with and in fluid isolation from the second heat-exchange section cold air channels. The bottom wall of the second heat-exchange section is secured adjacent the top wall of the first heat-exchange section.

A fixed contact oxidation catalyzed section of the multi-section heat exchanger also includes opposed top and bottom walls. A plurality of cold air channels are defined between the walls and the cold air channels are secured in fluid communication with the cold air channels of the second section. A plurality of hot air channels are also defined in the fixed contact oxidation catalyzed section and the hot air channels are secured in direct heat-exchange relationship with and in fluid isolation from the fixed contact oxidation catalyzed section cold air channels. The fixed contact oxidation catalyzed section hot air channels are secured in fluid communication with the anode exhaust line, with the second section hot air channels and with the first section hot air channels for directing the anode exhaust through the hot air channels of the multi-section cathode air heat exchanger. Additionally, the fixed contact oxidation catalyzed section hot air channels include an oxidation catalyst secured to interior surfaces of the oxidation catalyzed section hot air channels for burning the anode exhaust within the oxidation catalyzed hot air channels. The bottom wall of the oxidation catalyzed section is secured adjacent the top wall of the second heat-exchange section.

By use of the phrase "fixed contact" to describe the oxidation catalyzed section, it is meant that the hot air channels of the oxidation catalyzed section define a surface area A and a void volume B, defined by the surface area A, and are configured so that a fixed contact ratio of A/B of the hot air channels is between about 900 (expressed as square meters of surface area divided by cubic meters of void volume, or as "$m^2/m^3$") and about 7,500 $m^2/m^3$, and that the cold air channels of the oxidation catalyzed section define a surface area C and a void volume D defined by the surface area, and are configured so that a fixed contact ratio of the cold air channels is between about 900 $m^2/m^3$ and about 7,500 $m^2/m^3$.

As cool oxidant reactant, such as atmospheric air, flows from the cathode inlet line into the cool air channels of the first heat-exchange section of the multi-section cathode air heat exchanger, the oxidant absorbs heat from the hot air channels of the first heat exchange section, and continues to slowly warm as the oxidant then moves through the cool air channels of the second heat exchange section. The slowly warmed cathode oxidant then enters the cool air channels of the oxidation catalyzed section and immediately absorbs heat from the anode exhaust being burned within the hot air channels of the oxidation catalyzed section. By having the cathode oxidant flow in direct heat exchange relationship with the burning anode oxidant in the described fixed contact oxidation catalyzed heat exchanger having the above described ranges of fixed contact ratios, heat is immediately removed from the hot air channels of the oxidation catalyzed section so that a temperature within the oxidation catalyzed section can remain below 800° C. This permits the multi-section cathode air heat exchanger to be made of iron ("Fe") based stainless steel alloys, and avoid use of expensive alloys, such as nickel ("Ni") based super alloys.

An alternative embodiment of the present disclosure, the multi-section cathode air heat exchanger may have only one heat exchanger section secured adjacent the above-described fixed contact oxidation catalyzed section, or may have more than two heat-exchanger sections. In a further embodiment the oxidation catalyst may be secured to completely coat surfaces of the hot air channels, or may be secured in one partial location or two or more partial locations on the surface of the hot air channels. For example, the catalyst may be applied as a single strip mid-way along the hot air channels; as a first strip adjacent an entry of the hot air channel and as a second strip adjacent an exit of the hot air channels; or, as a single strip adjacent the exit of the hot air channels. Selective positioning of the oxidation catalyst along the hot air channels provides for even heat distribution and minimizing "hot spots", depending upon operating characteristics of the power plant, and fuel content of the anode exhaust stream being burned.

In an embodiment of the present disclosure, the hot air channels of the fixed contact oxidation catalyzed section may direct the burning and combusted anode gas to flow directly in an unimpeded manner into the hot air channels of the second and first heat exchanger sections of the multi-section cathode air heat exchanger. Alternatively, the hot air channels of the fixed contact oxidation catalyzed section may direct the hot combusted gases to flow through an interconnecting first hot-air manifold and then into the hot-air channels of the second heat exchange section, and then through a second hot-air manifold into the hot air channels of the first heat exchange section of the cathode air heat exchanger.

In another embodiment the cool air channels of the first heat exchange section, second heat exchange section and fixed contact oxidation catalyzed section may be configured so that the cool air passing through the cool air channels passes in a direction perpendicular to a direction of flow of the hot air in the adjacent hot air channels, which is otherwise referred to as a "cross-flow" arrangement. In this embodiment cool air channel interconnecting conduits direct flow of the cool air from the first heat exchange section, into the second heat exchange section and then into the fixed contact oxidation catalyzed section.

Accordingly, it is a general purpose to provide a solid oxide fuel cell power plant having a fixed contact oxidation catalyzed section of a multi-section cathode air heat exchanger that overcomes deficiencies of the prior art.

It is a more specific object to provide a solid oxide fuel cell power plant having a fixed contact oxidation catalyzed section of a multi-section cathode air heat exchanger that enhances efficiencies of operation of the power plant and decreases costs of manufacture and maintenance of the power plant.

DESCRIPTION OF THE PREFERRED EMBODIMENTS

Figure 1:
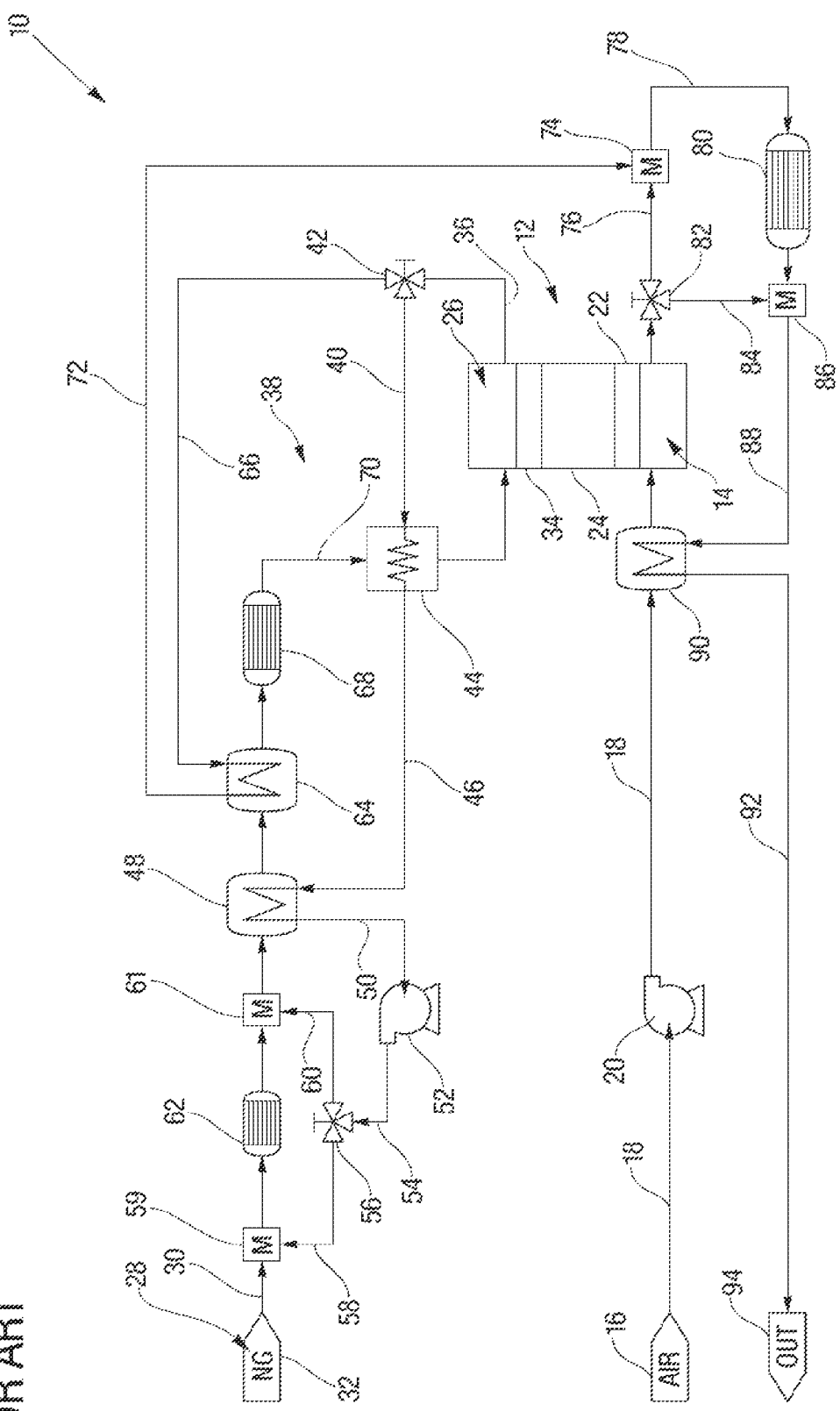
FIG. 1 is a simplified schematic drawing showing a prior art solid oxide fuel cell power plant.

Referring to the drawings in detail, a prior art solid oxide fuel cell power plant is shown in FIG. 1 and is generally designated by reference numeral 10. The power plant 10 includes a solid oxide fuel cell 12 having a cathode flow field 14 configured for receiving a flow of an oxidant reactant from an oxidant source 16, such as atmospheric air, through a cathode inlet line 18. An oxidant compressor 20 or compressed oxidant supply 20 is secured to the cathode inlet line 18 and the compressor 20 is configured for directing the flow of the oxidant reactant through the cathode flow field 14 in fluid communication with a cathode electrode 22 and an electrolyte 24. It is noted that the compressed oxidant supply 20 may be a known compressor 20 common to fuel cells, or may also be any apparatus or device capable of supplying a flow of an oxidant reactant stream at a predetermined pressure, such as a compressed air container with a pressure control valve, etc.

An anode flow field 26 is configured for receiving a flow of a reducing fuel 28 (such as natural gas, designated by "NG" in FIG. 1) through an anode inlet 30 from a fuel supply 32. The anode inlet 30 directs the flow of reducing fuel adjacent an anode electrode 34 and the electrolyte 24. An anode exhaust line 36 directs flow of the reducing fuel 28 out of the anode flow field 26 of the fuel cell 12 as an anode exhaust stream.

An anode exhaust recycle loop 38 directs flow of a portion of or all of the anode exhaust stream from the anode exhaust line 36 back into the anode inlet 30. The anode exhaust recycle loop 38 may include a series of extension lines or pipes of the loop 38. For example and as shown in FIG. 1 a first extension 40 of the loop 38 directs the anode exhaust stream from the anode exhaust line 36 and a first anode exhaust three-way valve 42 on the anode exhaust line 36 to an anode inlet heat exchanger 44. A second extension 46 of the loop 38 directs the anode exhaust stream from the anode inlet heat exchanger 44 to a first reformer heat exchanger 48. A third extension 50 of the loop 38 directs the anode exhaust stream from the first reformer heat exchanger 48 secured to the anode inlet 30 into an anode exhaust recycle loop blower 52. A fourth extension 54 of the loop 38 directs the anode exhaust stream from the blower 52 into a second anode exhaust three-way valve 56 which in turn selectively directs the anode exhaust stream through either a fifth extension 58 of the loop 38 or a sixth extension 60 of the loop 38 to different locations along the anode inlet 30. For example, the fifth extension 58 may be secured to a first anode inlet mixer 59 immediately downstream from the fuel supply 32 as shown in FIG. 1. The sixth extension 60 may be secured to a second anode inlet mixer 61 on the anode inlet 30 downstream from the first mixer 59. It is to be understood that the above-described solid oxide fuel cell power plant 10 of the prior art may include fewer or additional components as is known in the art.

When using natural gas as a fuel for a SOFC power plant it is common to include a component to remove sulfur from the fuel, such as a hydro-desulfurizer 62 secured to the anode inlet 30, optionally between the first and second anode inlet mixers 59, 61 into which the fifth and sixth extensions 58, 60 of the anode recycled loop are secured to the anode inlet 30, as shown in FIG. 1. Having the desulfurizer between the two mixers 59, 61 enables a control system (not shown) to control the second anode exhaust three-way valve 56 to carefully regulate a temperature of the natural gas fuel reactant entering the desulfurizer 62 and proceeding through the anode inlet 30. Additionally, a second reformer heat exchanger 64 may also be secured in thermal exchange relation with the fuel reactant passing through the anode inlet 30. The second reformer heat exchanger 64 receives a heated portion of the anode exhaust stream passing through the anode exhaust line 36 and the first anode three-way valve 42 into a second reformer heat exchanger feed line 66. The second reformer heat exchanger 64 and the first reformer heat exchanger 48 cooperate to provide an appropriate amount of heat to the fuel reactant stream passing through the anode inlet 30 as the fuel enters a fuel reformer, such as a catalytic steam reformer 68.

As is well known in the fuel cell art, such a fuel reformer produces a high concentration of hydrogen gas that is then fed into the anode flow field 26 through an extension 70 of the anode inlet 30. The pure hydrogen gas within the extension 70 may also pass through the anode inlet heat exchanger 44 that is in thermal exchange relation with the anode exhaust stream passing through the first extension 40 of the anode exhaust recycle loop 38.

Additional components common to such a SOFC power plant 10 may also include a heat exchanger anode discharge line 72 that directs a portion or all of the anode exhaust stream leaving the second reformer heat exchanger 64 (or any anode exhaust stream supplied heat exchanger 44, 48) from the heat exchanger 64 to a mixer 74 secured to a cathode exhaust line 76 downstream from the cathode flow field 14. Within the cathode exhaust line 76, the unburned fuel within the anode exhaust stream from the anode discharge line 70 mixes with oxygen and is then directed through a first extension 78 of the cathode exhaust line 76 into a burner 80 that ignites and oxidizes all of the unused fuel within the anode exhaust stream. The burner 80 may be used in any manner known in the fuel cell art, such as to produce steam for the catalytic steam reformer 68, etc. A cathode exhaust three-way valve 82 is secured to the cathode exhaust line 76 downstream from the cathode flow field 14 and is controlled by a power plant control system (not shown) to deliver into the first extension 78 of the cathode exhaust line 76 a predetermined amount of oxygen necessary to produce complete oxidation of the unused fuel within the anode exhaust stream passing through the burner 80. A portion of the cathode exhaust may be directed through the three-way valve 82 through a burner bypass line 84 into a burner exhaust mixer 86. From the burner exhaust mixer 86 a second extension 88 of the cathode exhaust line 76 directs a flow of the exhaust from the burner 80 and any cathode exhaust from the bypass line 84 optionally into a cathode heat exchanger 90 secured in thermal exchange relation with the oxidant stream passing through the cathode inlet 18. A third extension 92 of the cathode exhaust line directs the combined cathode exhaust and burner exhaust out of the power plant 10 through a cathode exhaust vent 94 (labeled in FIGS. 1-6 as "OUT" for efficiency of viewing). As discussed above, the burner 80 results in producing extremely high temperatures exceeding 800° C., and therefore requiring very expensive metals, such as nickel based super alloys.

Figure 2:
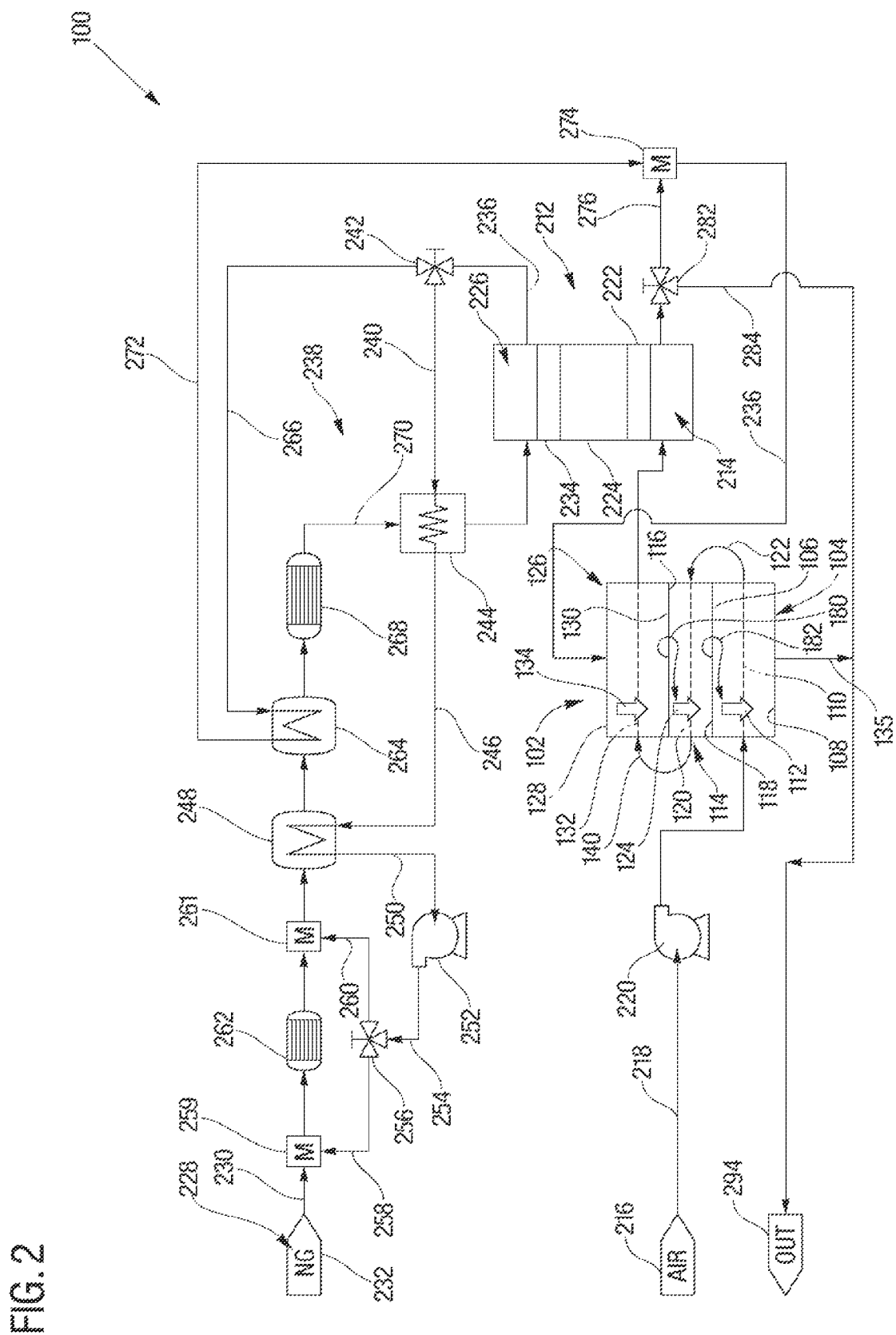
FIG. 2 is a simplified, schematic drawing showing a solid oxide fuel cell power plant with a fixed contact oxidation catalyzed section of a multi-section cathode air heat exchanger constructed in accordance with the present disclosure.

FIG. 2 shows a solid oxide fuel cell ("SOFC") power plant having a fixed contact oxidation catalyzed section of a multi-section cathode air heat exchanger of the present disclosure and is generally characterized by the reference numeral 100. For purposes of efficiency, the components of the prior art SOFC power plant 10 that are virtually identical to components of the FIG. 2 embodiment will be identified with two hundred added to the reference numerals of the FIG. 1 embodiment. For example, the solid oxide fuel cell 12 of FIG. 1 will be designated in FIG. 2 with the reference numeral 212. New components not shown in the prior art FIG. 1 but shown in FIGS. 2-8 will be represented by reference numerals from 100 to 210.

The SOFC power plant 100 of the present disclosure includes a solid oxide fuel cell 212 having a cathode flow field 214 configured for receiving a flow of a oxidant reactant 216 through a cathode inlet line 218 and an anode flow field 226 configured for receiving a flow of a reducing fuel 228 through an anode inlet line 230 from a fuel supply 232, and configured for directing the flow of the reducing fuel 228 out of the fuel cell 212 as an anode exhaust through an anode exhaust line 236. A multi-section cathode air heat exchanger 102 is secured in fluid communication with the cathode inlet 218 line and also with the anode exhaust line 236.

Figure 3:
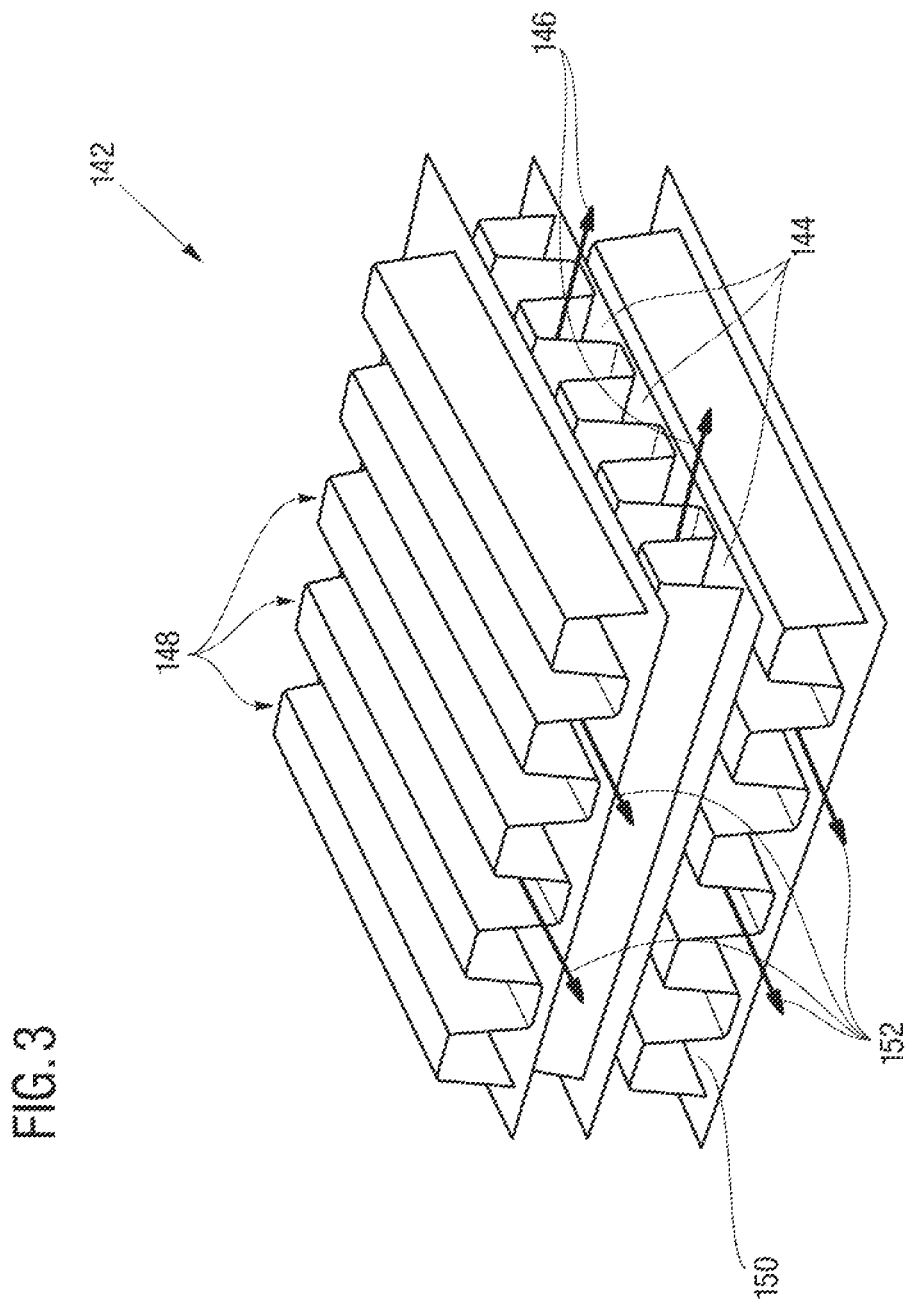
FIG. 3 is a simplified, schematic fragmentary drawing showing a section of direct heat exchange cold and hot air channels of a heat exchanger of the present disclosure.
Figure 4:
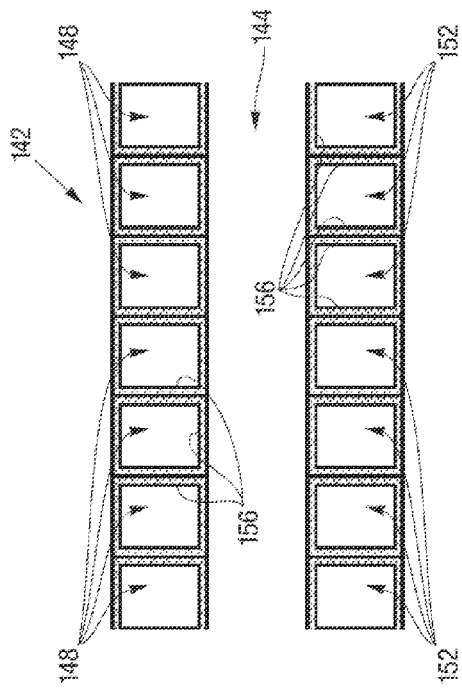
FIG. 4 is a simplified, fragmentary drawing showing a cross-section of a cross-flow heat exchanger of the present disclosure.
Figure 5:
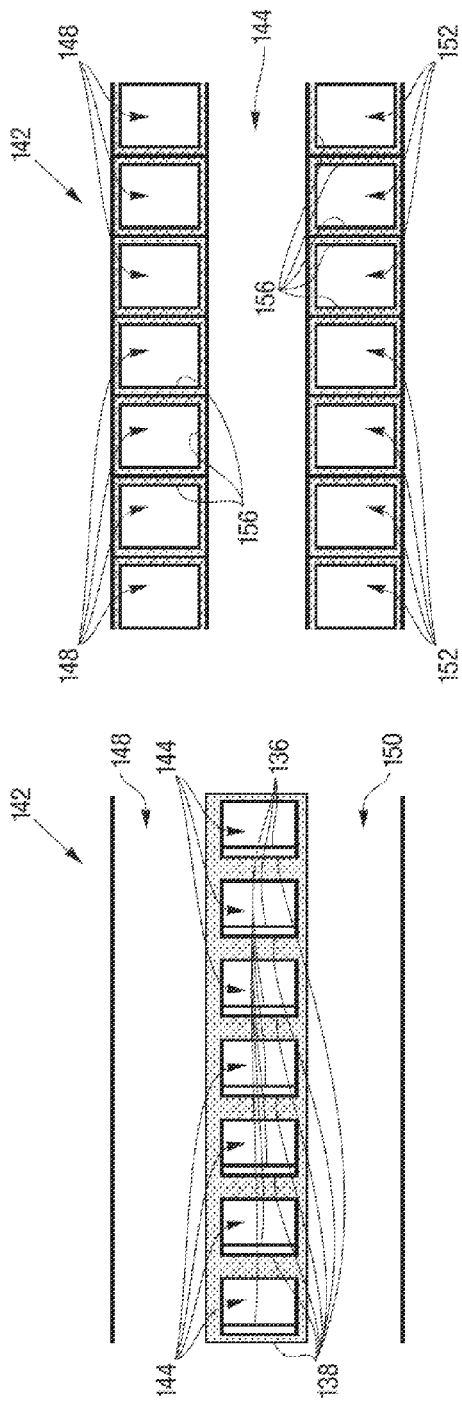
FIG. 5 is a simplified, fragmentary drawing showing the FIG. 4 drawing rotated ninety degrees.

The multi-section cathode air heat exchanger 102 includes at least a first heat-exchange section 104 having a top wall 106 and an opposed bottom wall 108 with a plurality of cold air channels 110 defined between the walls 106, 108. The cold air channels 110 are secured in fluid communication with the cathode inlet line 218 for directing the oxidant reactant 216 from the cathode inlet line 218 through the plurality of cold air channels 110. The first heat-exchange section 104 also includes a plurality of hot air channels 112 that are defined between the top and bottom walls 106, 108 and that are also secured in direct heat-exchange relationship with and in fluid isolation from the first heat-exchange section 104 cold air channels 110. (For purposes herein, the phrase "direct heat-exchange relationship" is to mean that each cold air channel is secured adjacent to and in physical contact with a hot air channel.) (It is also noted that FIG. 2 shows the channels 110, 112 as hatched lines and arrows respectively. FIGS. 3-5 show greater structural detail for the channels 110, 112.)

The multi-section cathode air heat exchanger 102 may also include a second heat-exchange section 114 that also has a top 116 and an opposed bottom wall 118. A plurality of cold air channels 120 are defined between the walls 116, 118 and the cold air channels 120 are secured in fluid communication through a first cold air interconnect 122 with the cold air channels 110 of the first heat-exchange section 104. The second heat-exchange section 114 also includes a plurality of hot air channels 124 that are secured in direct heat-exchange relationship with and in fluid isolation from the second heat-exchange section 114 cold air channels 120. The bottom wall 118 of the second heat-exchange section is secured adjacent the top wall 106 of the first heat-exchange section 104.

A fixed contact oxidation catalyzed section 126 of the multi-section heat exchanger 102 also include a top wall 128 and an opposed bottom wall 130. A plurality of cold air channels 132 are defined between the walls and the cold air channels 132 are secured in fluid communication with the cold air channels 120 of the second section 114. A plurality of hot air channels 134 are also defined in the fixed contact oxidation catalyzed section 126 and the hot air channels 134 are secured in direct heat-exchange relationship with and in fluid isolation from the cold air channels 132 of the oxidation catalyzed section 126. The fixed contact oxidation catalyzed section hot air channels 134 are secured in fluid communication with the anode exhaust line 236, with the second section hot air channels 124 and with the first section hot air channels 112 for directing the anode exhaust to be combusted in the fixed contact oxidation catalyzed section 126, and then through the hot air channels 124, 112, of the multi-section cathode air heat exchanger 102. Additionally, the fixed contact oxidation catalyzed section 126 hot air channels 134 include an oxidation catalyst 136 secured to interior surfaces 138 (136 and 138 being shown only in FIG. 4 and FIGS. 6-8) of the oxidation catalyzed section hot air channels 134 for burning the anode exhaust within the oxidation catalyzed hot air channels 136. The bottom wall 130 of the oxidation catalyzed section is secured adjacent the top wall of the second heat-exchange section 116. The cold air channels 120 of the oxidation catalyzed section 126 are fluid communication through a second cold air interconnector 140.

As described above, use of the phrase "fixed contact" to describe the oxidation catalyzed section 126, it is meant that the hot air channels 134 of the oxidation catalyzed section 126 define a surface area A and a void volume B, defined by the surface area A, and are configured so that a fixed contact ratio of A/B of the hot air channels 134 is between about 900 (expressed as square meters of surface area divided by cubic meters of void volume, or as "$m^2/m^3$") and about 7,500 $m^2/m^3$, and that the cold air channels 132 of the oxidation catalyzed section 126 define a surface area C and a void volume D, defined by the surface area C, and are configured so that a fixed contact ratio of the cold air channels 132 is between about 900 $m^2/m^3$ and about 7,500 $m^2/m^3$.

In an alternative embodiment of the presently disclosure SOFC power plant 100, the multi-section cathode air heat exchanger 126 may have only one heat exchanger section 114 secured adjacent the above-described fixed contact oxidation catalyzed section 126, or may have more than the two described heat-exchanger sections 104, 114.

FIG. 3 shows a simplified, schematic fragmentary, perspective drawing of an exemplary portion 142 the fixed contact heat exchanger from the oxidation catalyzed section 126 of the multi-section cathode air heat exchanger 102. The portion 142 shows a plurality of exemplary hot air channels 144 having flow direction arrows 146 emerging from the hot air channels 144. Adjacent opposed planar surfaces of the exemplary hot air channels 144 are a first plurality of exemplary cold air channels 148 and a second plurality of exemplary cold air channels 150. The cold air channels 150 show flow direction arrows 152 emerging from the cold air channels 150. The FIG. 3 exemplary portion 142 of a cross flow plate fin heat exchanger 142, and also shows an example of hot air channels 144 being in "direct heat-exchange relationship" with the cold air channels 148, 150 wherein each hot air channel 144 is secured adjacent to and in direct heat exchange relationship with at least one cold air channel 148, 150.

FIG. 4 shows a simplified, fragmentary cross-section, plan view approximately the same as the FIG. 3 exemplary portion 142 of the fixed contact oxidation catalyst section 126 of the multi-stage cathode air heat exchanger 102. In the FIG. 4 drawing, the angle of viewing is toward the direction of hot gas flow arrows 146 of FIG. 3. The portion 154 includes the plurality of hot gas channels 144, the first plurality of cold gas channels 148, and the second plurality of cold gas channels 150. Also shown in FIG. 4 are oxidation catalysts 136 secured adjacent portions of interior surfaces 138 of the hot gas channels 134 (shown in FIG. 2), 144 shown in FIG. 4. Acceptable oxidation catalysts include precious metals such as Pt (platinum), Pd (palladium) or mixture of Pt/Pd, etc.

FIG. 5 is simplified, fragmentary cross-section, plan view approximately the same as the FIG. 3 exemplary portion 142 of the fixed contact oxidation catalyst section 126 of the multi-stage cathode air heat exchanger 102 as shown in FIG. 4. The FIG. 5 view is rotated ninety degrees from the FIG. 4 view, so that the angle of viewing FIG. 5 is toward the direction of cold gas flow arrows 152 of FIG. 3. The cold air channels 148, 150 of the oxidation catalyzed section 126 in FIG. 5 show an optional coating of an aluminum oxide layer 156 adjacent entire interior surfaces of the cold air channels 148, 150. The entire interior surfaces of the cold air channels 110, 120 of the first and second sections 104, 114 may also include surfaces having aluminum oxide layers (not shown). The addition of the aluminum oxide layers ($Al_2O_3$) minimizes evaporation of chromium from the stainless steel materials forming the channels 110, 120, 148, thereby enhancing long term stability of the power plant 100. There are many coating technologies available in the market such as CVD (Chemical Vapor Deposition) and spray coating. The aluminum oxide layers may include either a single layer or a plurality of layers, wherein each layer has a thickness between about three microns to one-hundred microns.

Figure 6:
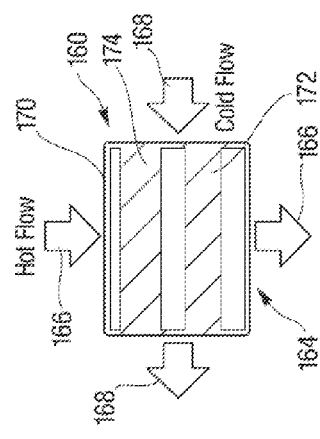
FIG. 6 is a simplified, fragmentary view of a single strip of an oxidation catalyst applied to a surface adjacent an exit of a hot air channel.
Figure 7:
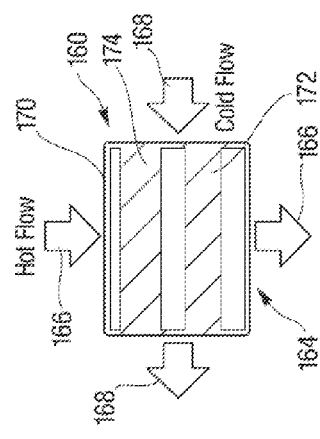
FIG. 7 is a simplified, fragmentary view of a single strip of an oxidation catalyst applied to a middle of a surface of a hot air channel.
Figure 8:
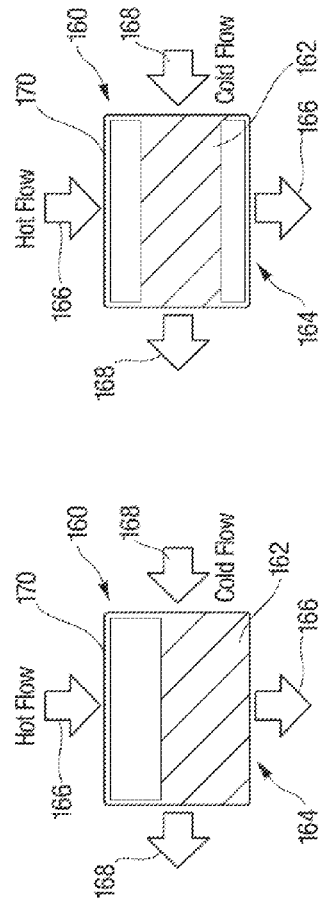
FIG. 8 is a simplified, fragmentary view of two strips of an oxidation catalyst applied to separate locations upon a surface of a hot air channel

FIG. 6 shows a simplified, fragmentary view of a hot air channel surface portion 160 of a hot air channel 134 of the fixed contact oxidation catalyzed section 126 of the multi-section cathode air heat exchanger 102. In the FIG. 6 embodiment of the portion 160, an oxidation catalyst 162 is applied adjacent an outlet 164 of the channel portion 160. FIGS. 6, 7 and 8 show varying positioning of the oxidation catalyst upon the channel portion surface 160. Also, FIGS. 6, 7 and 8 show hot flow directional arrows 166 and cold flow directional arrows 168 to emphasize the "cross-flow" arrangement of the oxidation catalyzed section 126 of the cathode air heat exchanger 102. In the FIG. 7 embodiment, the oxidation catalyst 162 is applied to the hot air channel surface portion 160 at an area that is mid-way between a channel inlet 170. In the FIG. 8 embodiment, a first oxidation catalyst strip 172 is applied near the channel outlet 164, and a second oxidation catalyst strip 174 is applied separate from the first strip 172 and near the channel inlet 170. Placement of the oxidation catalyst may be selected to accommodate operating conditions of a particular power plant 100 to achieve maximum combustion of the anode exhaust fuel and minimal development of any localized hot spots that might exceed 800° C. The oxidation catalyst 162 may also be applied to an entire surfaces of the hot air channels 134 of the fixed contact oxidation catalyzed section 126 of the multi-section cathode air heat exchanger 102.

The hot air channels 134 of the fixed contact oxidation catalyzed section 126 may direct the burning and combusted anode gas to flow directly in an unimpeded manner into the hot air channels 124, 112 of the second and first heat exchanger sections 104, 114 of the multi-section cathode air heat exchanger 102, and then out of the power plant through a heat exchanger exhaust line 135 connected to a power plant vent 294. Alternatively, the hot air channels 134 of the fixed contact oxidation catalyzed section 126 may direct the hot combusted gases to flow through an interconnecting first hot-air manifold 180 (shown schematically in FIG. 2) and then into the hot air channels 124 of the second heat exchange section 114, and then through a second hot-air manifold 182 (shown schematically in FIG. 2) into the hot air channels 112 of the first heat exchange section 104 of the cathode air heat exchanger 102. The first and second interconnecting hot air manifolds 180, 182 may be any fluid directing means for achieving the described function, such as integral manifolds 180, 182 cut into exterior adjacent surfaces of the sections 104, 114, 126 of the multi-section cathode air heat exchanger 102, pipes 180, 182 secured in fluid communication between the hot air channels 134, 124, 112 and other fluid directing apparatus known in the art.

As described above, in an embodiment of the present power plant 100, the cool air channels 110, 122, 132 of the first heat exchange section 104, second heat exchange section 114 and fixed contact oxidation catalyzed section 126 may be configured so that the cool air passing through the cool air channels 110, 122, 132 passes in a direction perpendicular to a direction of flow of the hot air in the adjacent hot air channels 112, 124, 134 which is otherwise referred to as a "cross-flow" arrangement. In this embodiment the first and second cool air channel interconnecting conduits 122, 140 (shown in FIG. 2) direct flow of the cool air from the cold air channels 110 of first heat exchange section 104, into the cold air channels 120 of the second heat exchange section 114 and then into cold air channels 132 of the fixed contact oxidation catalyzed section 126.

The inventors of the present disclosure performed computer model test evaluations of temperatures of an exemplary fixed contact oxidation catalyzed heat exchanger similar to the heat exchanger 126 described above compared to a non-oxidation catalyzed heat exchanger. In particular the test measured: wall temperature, in I. a non-oxidation catalyzed heat exchanger and in II. an oxidation catalyzed heat exchanger. The results are as follows:

I. In the non-oxidation catalyzed heat exchanger, the hot gas at the entry of the heat exchanger was at a temperature of 920° C. and left the heat exchanger at a temperature at approximately 840° C. The wall temperature for this transit of the hot gas through the non-oxidant catalyzed heat exchanger was about 830° C. at the inlet of the heat exchanger and about 730° C. at the outlet.

II. In the oxidation catalyzed heat exchanger, the hot gas at the entry of the heat exchanger was at a temperature of 780° C. and left the heat exchanger at a temperature at approximately 850° C. The wall temperature for this transit of the hot gas through the oxidant catalyzed heat exchanger was about 750° C. at the inlet of the heat exchanger and about 790° C. at the outlet.

This establishes that the fixed contact oxidation catalyzed heat exchanger 126 as described above can keep the temperature of the wall material defining the hot air channels 134 and cold gas channels 132 below the critical temperature of 800° C.

For purposes herein, the word "about" is to mean plus or minus ten percent. All patents identified in this document are hereby incorporated herein by reference thereto.

While the above disclosure has been presented with respect to the described and illustrated embodiments of a solid oxide fuel cell power plant having a fixed contact oxidation catalyzed section of a multi-section cathode air heat exchanger, it is to be understood that the disclosure is not to be limited to those alternatives and described embodiments. For example, it is to be understood the above descriptions and illustrations focus upon a single solid oxide fuel cell 212. However, in ordinary operating power plants of the present disclosure it is likely that the fuel cell 212 will be one of many fuel cells cooperatively secured in a fuel cell stack assembly configured to produce a predetermined amount of electrical power and heat. Accordingly, reference should be made primarily to the following claims rather than the foregoing description to determine the scope of the disclosure.

What is claimed is:

1. A solid oxide fuel cell power plant for generating an electrical current, the power plant comprising:

a. a solid oxide fuel cell having a cathode inlet line and an anode exhaust line;

b. a multi-section cathode air heat exchanger secured in fluid communication with the cathode inlet line and the anode exhaust line, the heat exchanger including:

i. at least one first heat-exchange section including opposed top and bottom walls and that defines a plurality of cold air channels between the walls and that are secured in fluid communication with the cathode inlet line for directing the oxidant reactant from the cathode inlet line through the plurality of cold air channels, the first heat-exchange section also defining a plurality of hot air channels between the walls and secured in direct heat-exchange relationship with and in fluid isolation from the first heat-exchange section cold air channels;

ii. a fixed contact oxidation catalyzed section including opposed top and bottom walls and that defines a plurality of cold air channels between the walls and that are secured in fluid communication with the cold air channels of the first heat exchange section, the fixed contact oxidation catalyzed section also defining a plurality of hot air channels secured in direct heat-exchange relationship with and in fluid isolation from the oxidation catalyzed section cold air channels, the fixed contact oxidation catalyzed section hot air channels secured in fluid communication with the anode exhaust line, with the first section hot air channels for directing the anode exhaust through the hot air channels of the multi-section cathode air heat exchanger, and the oxidation catalyzed section hot air channels including an oxidation catalyst secured to interior surfaces of the oxidation catalyzed section hot air channels for burning the anode exhaust within the oxidation catalyzed hot air channels, the bottom wall of the oxidation catalyzed section being secured adjacent the top wall of the second heat-exchange section; and, iii. wherein, a fixed contact ratio of the hot air channels of the fixed contact oxidation catalyzed section is between about 900 $m^2/m^3$ and about 7,500 $m^2/m^3$, and wherein a fixed contact ratio of the cold air channels is between about 900 $m^2/m^3$ and about 7,500 $m^2/m^3$.

2. The solid oxide fuel cell power plant of claim 1, wherein the oxidation catalyst is secured to a portion of surfaces of the fixed contact oxidation catalyzed section hot air channels adjacent outlets of the hot air channels.

3. The solid oxide fuel cell power plant of claim 1, wherein the oxidation catalyst is secured to a portion of surfaces of the fixed contact oxidation catalyzed section hot air channels adjacent inlets of the hot air channels.

4. The solid oxide fuel cell power plant of claim 1, wherein a first oxidation catalyst strip is secured to a portion of surfaces of the fixed contact oxidation catalyzed section hot air channels adjacent inlets of the hot air channels, and a second oxidation catalyst strip is secured to portion of surfaces of the fixed contact oxidation catalyzed section hot air channels adjacent outlets of the hot air channels.

5. The solid oxide fuel cell power plant of claim 1, further comprising an aluminum oxide layer secured adjacent entire interior surfaces of the cold air channels of the first section and of the fixed contact oxidation catalyzed section of the multi-section cathode air heat exchanger.

6. The solid oxide fuel cell power plant of claim 5, wherein the aluminum oxide layer further comprises one of a single layer and a plurality of layers, wherein each layer has a thickness between about three microns to one-hundred microns.

7. The solid oxide fuel cell power plant of claim 1, wherein burning and combusted anode gas within the hot air channels of the fixed contact oxidation catalyzed section flow directly in an unimpeded manner into the hot air channels of the first heat exchanger section of the multi-section cathode air heat exchanger.

8. The solid oxide fuel cell power plant of claim 1, further comprising the cool air channels of the first heat exchange section and the fixed contact oxidation catalyzed section configured so that cool air passing through the cool air channels passes in a direction perpendicular to a direction of flow of hot air in the adjacent hot air channels of the first heat exchange section and the fixed contact oxidation catalyzed section.

9. A solid oxide fuel cell power plant for generating an electrical current, the power plant comprising:

a. a solid oxide fuel cell having a cathode inlet line and an anode exhaust line;

b. a multi-section cathode air heat exchanger secured in fluid communication with the cathode inlet line and the anode exhaust line, the heat exchanger including:

i. a first heat-exchange section including opposed top and bottom walls and that defines a plurality of cold air channels between the walls and that are secured in fluid communication with the cathode inlet line for directing the oxidant reactant from the cathode inlet line through the plurality of cold air channels, the first heat-exchange section also defining a plurality of hot air channels between the walls and secured in direct heat-exchange relationship with and in fluid isolation from the first heat-exchange section cold air channels;

ii. a second heat-exchange section including opposed top and bottom walls and that defines a plurality of cold air channels between the walls that are secured in fluid communication with the cold air channels of the first heat-exchange section, the second heat-exchange section also defining a plurality of hot air channels secured in direct heat-exchange relationship with and in fluid isolation from the second heat-exchange section cold air channels, the bottom wall of the second heat-exchange section being secured adjacent the top wall of the first heat-exchange section; and, iii. an oxidation catalyzed section including opposed top and bottom walls and that defines a plurality of cold air channels between the walls and that are secured in fluid communication with the cold air channels of the second section, the oxidation catalyzed section also defining a plurality of hot air channels secured in direct heat-exchange relationship with and in fluid isolation from the oxidation catalyzed section cold air channels, the oxidation catalyzed section hot air channels secured in fluid communication with the anode exhaust line, with the second section hot air channels and with the first section hot air channels for directing the anode exhaust through the hot air channels of the multi-section cathode air heat exchanger, and the oxidation catalyzed section hot air channels including an oxidation catalyst secured to interior walls of the oxidation catalyzed section hot air channels for burning the anode exhaust within the oxidation catalyzed hot air channels, the bottom wall of the oxidation catalyzed section being secured adjacent the top wall of the second heat-exchange section; and, iv. wherein, the hot air channels of the oxidation catalyzed section define a surface area A and a void volume B, defined by the surface area A, and are configured so that a fixed contact ratio of A/B of the hot air channels is between about 900 m²/m³ and about 7,500 m²/m³, and wherein the cold air channels of the oxidation catalyzed section defines a surface area C and a void volume D, defined by the void volume C, and are configured so that a fixed contact ratio of the cold air channels is between about 900 m²/m³ and about 7,500 m²/m³.

10. The solid oxide fuel cell power plant of claim 9, wherein the oxidation catalyst is secured to a portion of surfaces of the fixed contact oxidation catalyzed section hot air channels adjacent outlets of the hot air channels.

11. The solid oxide fuel cell power plant of claim 9, wherein the oxidation catalyst is secured to a portion of surfaces of the fixed contact oxidation catalyzed section hot air channels adjacent inlets of the hot air channels.

12. The solid oxide fuel cell power plant of claim 9, wherein a first oxidation catalyst strip is secured to a portion of surfaces of the fixed contact oxidation catalyzed section hot air channels adjacent inlets of the hot air channels, and a second oxidation catalyst strip is secured to portion of surfaces of the fixed contact oxidation catalyzed section hot air channels adjacent outlets of the hot air channels.

13. The solid oxide fuel cell power plant of claim 9, further comprising an aluminum oxide layer secured adjacent entire interior surfaces of the cold air channels of the first section and of the fixed contact oxidation catalyzed section of the multi-section cathode air heat exchanger.

14. The solid oxide fuel cell power plant of claim 13, wherein the aluminum oxide layer further comprises one of a single layer and a plurality of layers, wherein each layer has a thickness between about three microns to one-hundred microns.

15. The solid oxide fuel cell power plant of claim 9, wherein burning and combusted anode gas within the hot air channels of the fixed contact oxidation catalyzed section flow directly in an unimpeded manner into the hot air channels of the first heat exchanger section and the second heat exchanger section of the multi-section cathode air heat exchanger.

16. The solid oxide fuel cell power plant of claim 9, further comprising the cool air channels of the first heat exchange section, the second heat exchange section and the fixed contact oxidation catalyzed section configured so that cool air passing through those cool air channels passes in a direction perpendicular to a direction of flow of hot air in the adjacent hot air channels of the first heat exchange section, the second heat exchange section and the fixed contact oxidation catalyzed section.

17. A method of operating the solid oxide fuel cell power plant of claim 1, comprising:
 a. directing flow of the anode exhaust through the hot air channels of the multi-section cathode air heat exchanger;
 b. burning the anode exhaust within the hot air channels of the oxidation catalyzed section hot air channels;
 c. preventing a temperature of the multi-section cathode air heat exchanger from exceeding about eight-hundred degrees Celsius by directing flow of the oxidant reactant from the cathode inlet line through the plurality of cold air channels within the multi-section cathode air heat exchanger.

\* \* \* \* \*